United States Patent Office 3,239,358
Patented Mar. 8, 1966

3,239,358
BIFIDUS-ACTIVE SUBSTANCE AND BIFIDUS-ACTIVE FOOD PREPARATIONS
Friedrich Petuely, Graz, Austria, assignor, by mesne assignments, to North American Philips Company, Inc., New York, N.Y., a corporation of Delaware
No Drawing. Original application May 15, 1961, Ser. No. 110,186, now Patent No. 3,126,371, dated Mar. 24, 1964. Divided and this application Dec. 9, 1963, Ser. No. 336,088
2 Claims. (Cl. 99—54)

This is a division of application Serial No. 110,186, filed May 15, 1961.

It is known that lactulose has a satisfactory bifidus-activity, that is to say, that when infants not nursed at the breast are given a food preparation having a lactose (lactulose) protein quotient greater than 2.6 and containing 0.5 to 7 g. of lactulose per 70 calories, a pure or substantially pure bifidus flora is produced in the intestinal tract of the new-born children.

It has now been found that not only with lactulose but also with its hydration product, which is a mixture of lactite and lactulite, and with either of these substances food preparations for infants may be made which enable a pure or substantially pure bifidus flora to be produced in the intestinal tract.

The mixture of lactite and lactulite can either be produced by hydrogenation of an aqueous solution of lactulose with Raney nickel and hydrogen or by mixing lactite with lactulite.

The Formula I

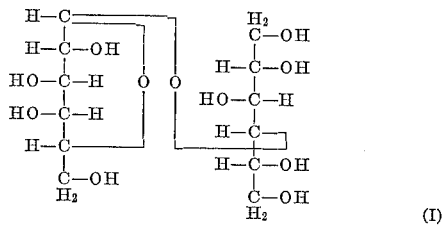

(β-galactosidosorbite) can be ascribed to lactite and the Formula II

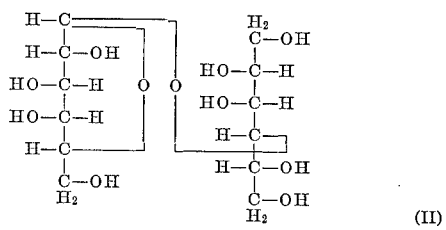

(β-galactosidomannite) to lactulite. The Formula III

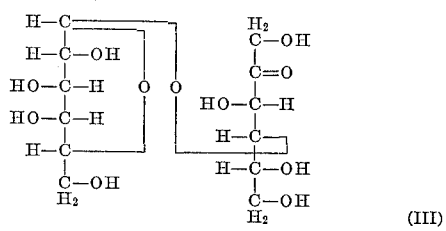

is attributed to lactulose.

Lactite is a known compound the production of which is described in a thesis of the Technische Hochschule at Brunswic "Darstellung von Cellobiulose und Melibiulose" (Hoepke), 1958. The compounds can be produced by hydrogenation of lactose, for example with Raney-nickel and hydrogen, at a pressure of about 160 atm.

Lactulite has not yet been described in the literature. According to the invention, the compound is produced by hydrogenation of lactulose. By separating off the lactite formed in the same reaction, the lactulite can be obtained in the pure state. The hydrogenation may be carried out in the same manner as that described by Hoepke for the production of lactite. The separation of lactite from lactulite may be performed by the known methods for the separation of sugars or sugar-like compounds. Satisfactory results were obained with chromatographic adsorption.

For the production of the preparations according to the invention, the addition to a conventional food preparation suitable for children and having a lactose-protein quotient exceeding 2.0, of from 0.5 to 3 g. of lactite or from 0.2 to 2 g. of lactulite or a mixture of 0.1 to 2.5 g. of lactite and 0.1 to 1.8 g. of lactulite per 70 calories is sufficient.

The finished food preparation should have a lactose-protein quotient between 2.0 and 8, preferably between 2.5 and 5. In general, a pure bifidus flora is produced by the daily administration to an infant of an amount of a food preparation according to the invention corresponding to 100 to 150 calories, preferably to about 120 calories, per kgm. of body weight.

In most cases a daily dose of about 12 g. of lactite or 6 g. of lactulite is sufficient to produce and maintain a pure bifidus flora. This small dose of lactulite is an improvement upon the use of lactulose which usually has to be used in daily amounts exceeding 6 g. The lactite has the practical advantage that it can be more readily prepared than lactulose, inter alia owing to the formation of a smaller number of by-products.

EXAMPLE I

Method of producing lactite 250 g. of lactose were dissolved in 170 cc. of distilled water at a temperature of 80° C. and then introduced in an autoclave together with 12.5 g. of Raney-nickel. Hydrogen was then introduced into the autoclave at a pressure of 120 atm., the (rotating) autoclave being heated to a temperature of from 140–150° C. During heating, the pressure increased to about 160 atm. During the treatment the pressure decreased necessitating the introduction of more hydrogen.

After about 4 hours the reaction was completed, as was apparent from the fact that the pressure remained constant. The reaction liquid was cooled and filtered. The nickel salts were removed from the green filtrate by passing it over ion exchangers. The cation exchanger used was Lewatit K.S.B. and the anion exchanger was Lewatit M1. The yield was 94%.

EXAMPLE II

Method of producing lactulite

In the same manner as described in Example I, 15 g. of lactulose dissolved in 150 cc. of water were reduced with a Raney-nickel catalyst. The maximum temperature used was 90° C., while the hydrogen pressure was maintained at about 120 atm.

EXAMPLE III

Method of producing a bifidus-active food preparation 100 cc. of pasteurised whole milk having a fat content of 3.8% were mixed with 50 cc. of boiled water, 8 g. of lactose and 2 g. of lactite. The mixture had a calorific value of about 150 calories. Infants from 0–6 months were given in the usual manner daily amounts of this food such that they received about 120 calories per kgm. of body weight. Within from 2 to 4 days, a substantially pure bifidus flora was found in the faeces of all the children.

EXAMPLE IV

In exactly the same manner as described in Example III, a food preparation was made from 100 cc. of pasteurised whole milk, 50 cc. of boiled water, 8 g. of lactose and 1.5 g. of lactulite. When this mixture was used to feed infants, a substantially pure bifidus flora was produced.

What is claimed is:

1. A bifidus-active food preparation having a lactose-albumin quotient from 2.0–8 and containing from 0.5–3 grams of lactite or from 0.2 to 2 grams of lactulite per 70 calories.

2. A bifidus-active food preparation having a lactose-albumin quotient of from 2–8 and containing per 70 calories a mixture of lactite and lactulite, in which mixture the amount of lactite lies between 0.1 to 2.5 grams, and the amount of lactulite between 0.1 and 1.8 grams.

References Cited by the Examiner

UNITED STATES PATENTS 2,811,450 10/1957 Graz _____ 99—54
2,872,382 2/1959 Keck _____ 195—100

A. LOUIS MONACELL, *Primary Examiner.*

L. M. SHAPIRO, *Assistant Examiner.*